March 31, 1931. J. W. FOLEY 1,798,529
ROLLER BEARING
Filed Oct. 12, 1927 3 Sheets-Sheet 1
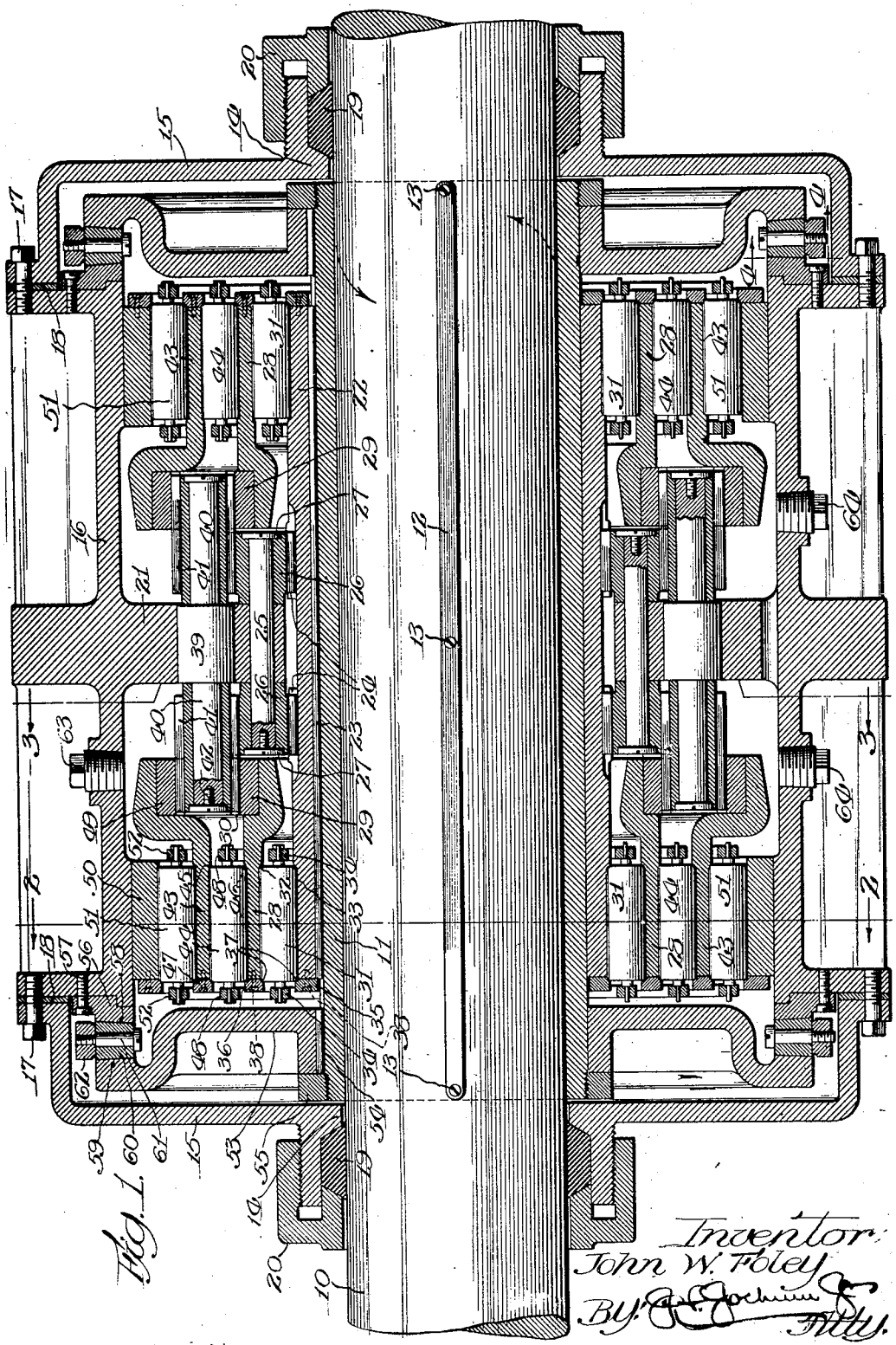

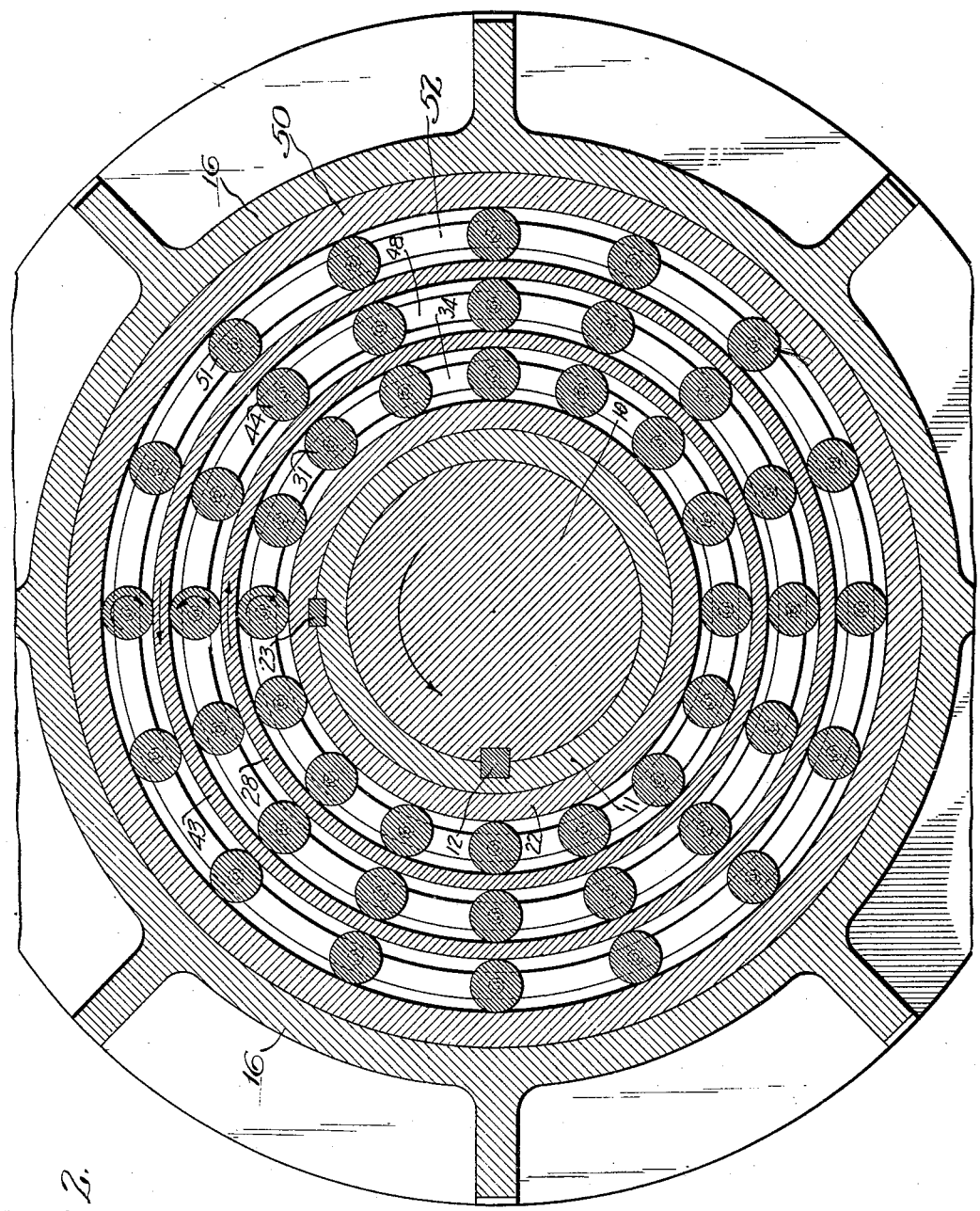

March 31, 1931.  J. W. FOLEY  1,798,529
ROLLER BEARING
Filed Oct. 12, 1927   3 Sheets-Sheet 3
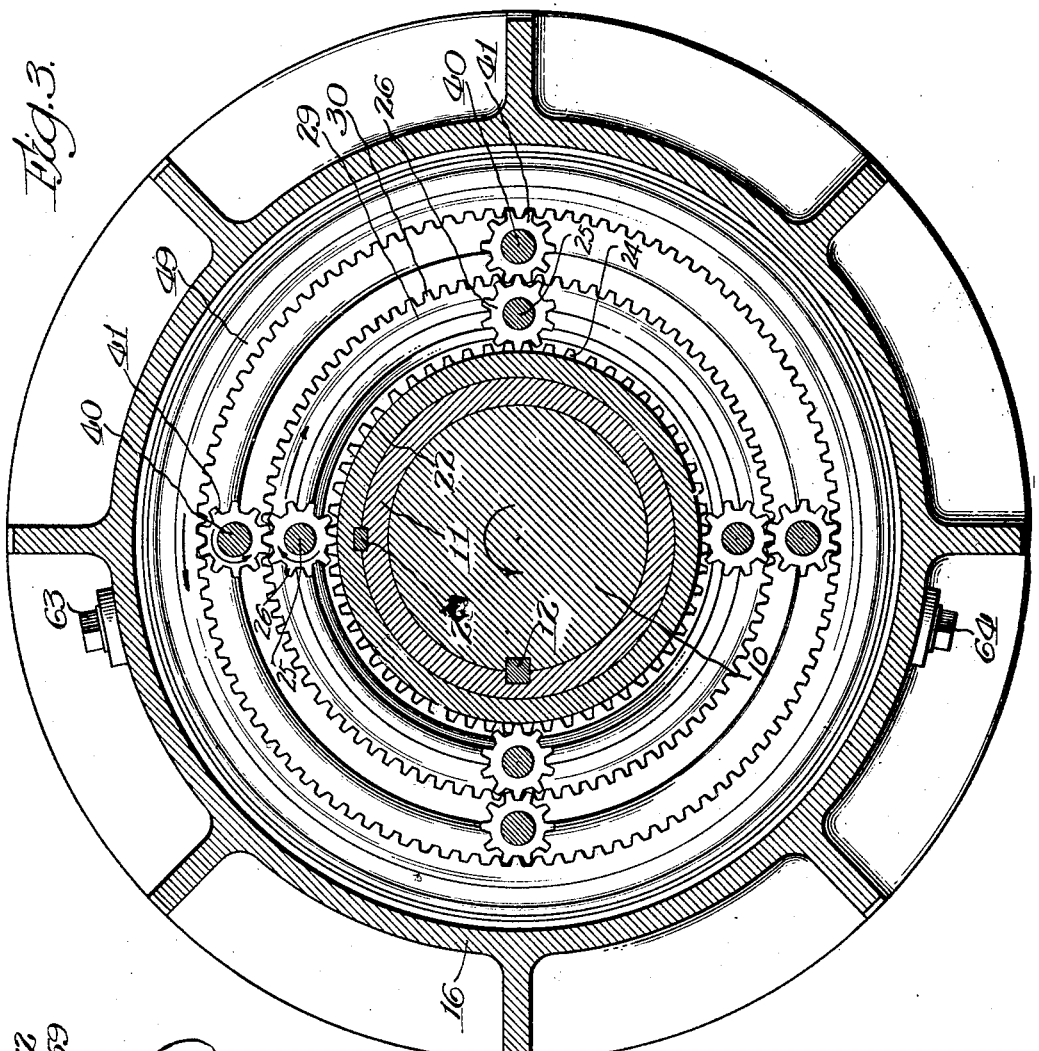
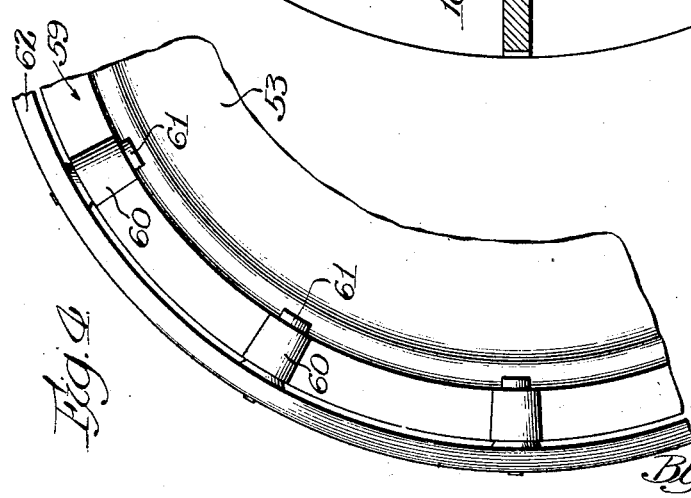
Inventor:
John W. Foley Patented Mar. 31, 1931

1,798,529

UNITED STATES PATENT OFFICE

JOHN W. FOLEY, OF CHICAGO, ILLINOIS

ROLLER BEARING

Application filed October 12, 1927. Serial No. 225,690.

This invention relates to improvements in roller bearings, and one of the objects of the same is to provide a bearing of this character adapted to handle heavy loads such for instance as heavily loaded trains or vehicles, rolling mill machinery, heavy duty machine tools, and the like.

A further object is to provide improved means whereby the end thrust will be transmitted directly from the shaft into the housing of the bearing and at the same time radial friction will be reduced to a minimum.

A further object is to provide an improved bearing of this character so constructed and arranged that access may be readily had to the interior thereof and in which bearing the parts may be readily assembled.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a longitudinal sectional view of a bearing of this character constructed in accordance with the principles of this invention.

Figure 2 is a sectional view taken on line 2—2, Figure 1.

Figure 3 is a sectional view taken on line 3—3, Figure 1.

Figure 4 is a detail sectional view taken on line 4—4, Figure 1.

Referring more particularly to the drawings the numeral 10 designates a shaft which is encompassed by a sleeve 11, the sleeve being secured to the shaft for rotation therewith in any suitable manner preferably by means of a key 12 which is recessed into the shaft to project beyond the periphery thereof, and the key may be secured in position by means of suitable fastening devices 13.

The shaft passes through a packing box 14 formed in end plates 15 of a housing 16, the end plates being secured in position by means of suitable fastening bolts 17, and packing 18 is provided between the ends of the housing and the end plates to form a fluid tight casing in which the bearing operates. Packing 19 is also provided and by means of bushings 20 fluid tight joints will be provided between the shaft and the end plates.

The internal diameter of the housing 16 is considerably greater than the external diameter of the sleeve 11 and the sleeve 11 is of a length substantially equal to the length of the housing so that the ends of the sleeve preferably terminate adjacent the respective end plates 15.

A rib 21, preferably arranged midway of the length of the housing projects from the inner face of the housing and terminates short of the sleeve 11.

Encompassing the sleeve 11 is a sleeve 22 which is secured to the sleeve 11 for rotation therewith in any suitable manner preferably by means of a key 23 which is preferably constructed and mounted in a manner similar to the key 12. The sleeve 22 terminates for a considerable distance short of the end plates 15 and formed on the periphery of the sleeve 22 are gear teeth 24 arranged in two series spaced from each other in directions lengthwise of the sleeve 22 so as to stand on opposite sides of and in close proximity to the rib 21.

Supported by the rib 21 are shafts 25 which pass therethrough and are arranged about the sleeve 22. These shafts 25 are preferably secured against rotation with respect to the flange 21 and extend on opposite sides thereof, and journaled upon the projecting extremities of the shaft 25 are gears 26 which mesh respectively with the two series of gear teeth 24. The gears 26 may be held against displacement with respect to the shaft 25 by means of headed screws 27.

Encompassing the sleeve 22 and spaced therefrom and arranged on opposite sides of the rib 21 are sleeves 28 and secured to the inner ends of each of these sleeves are annular members 29 provided with external gear teeth 30, which latter are arranged in alinement with the teeth of the respective gears 24. The internal diameter of the sleeves 28 adjacent one end thereof is considerably greater than the external diameter of the proximate ends of the sleeve 22 so as to form spaces therebetween in which elongated rollers 31 are arranged.

The construction and operation of the rollers and the mountings therefor on each side of the rib 21 is the same and therefore the description of one will apply equally as well as to them both.

The inner surface of the sleeve 28 is shaped to form a shoulder 32 at one end of the rollers 31, while the periphery of the sleeve 22 is also shaped to form a shoulder 33. These shoulders 32—33 co-operate to prevent the rollers 31 from moving in directions lengthwise of their axes in one direction.

The rollers 31 are connected by means of annular members 34 in which the rollers are journaled so that the rollers will move bodily in unison. Annular members 35—36 are secured to the ends of the sleeves 22 and 28 and overhang the ends of the rollers 31 as at 37 to prevent the rollers 31 from moving lengthwise of their axes in the opposite directions.

These annular members 35—36 may be secured in position in any suitable manner such as by means of fastening screws 38.

Supported also by the rib 21 in any suitable manner and preferably against rotation with respect thereto is a member 39 the extremities 40 of which project on opposite sides of the flange 21 and are shaped to form shafts upon which gears 41 are loosely mounted on opposite sides of the flange. These gears may be held in position in any suitable manner preferably by means of headed screws 42 engaging the ends of the shaft 40.

The teeth of the gears 41 are elongated and mesh with the teeth of the gears 24 and also with the teeth 30 of the annular member 29, so that when the sleeves 11 and 22 are rotated, the gear teeth 24 on the sleeve 22 meshing with the gear 26 will rotate the latter, and as the gears 26 mesh with the gear teeth 41, the latter will be rotated, and as these gear teeth 41 also mesh with the teeth 30 of the annular member 29 which is secured to the sleeve 28 the sleeve 28 will also be rotated in a direction opposite to the direction of rotation of the sleeves 22 and 11.

The sleeves 28 will roll upon the rollers 31.

Encompassing the sleeve 28 and spaced therefrom is another sleeve 43 and interposed between the sleeves 28 and 43 are elongated rollers 44 which are held against longitudinal displacement with respect to the sleeves by means of shoulders 45—46 formed on the respective sleeves adjacent one end of the roller, and an annular member 47 secured against the other end of the sleeve in proximity to the other end of the rollers 44. This annular member 47 encompasses the annular member 36 and is held in position in any suitable manner.

The rollers 44 are journaled in annular members 48.

Connected with the inner face of the sleeve 43 and adjacent the inner end thereof is an internal gear toothed member 49 with which the teeth of the gear 41 meshes, and the inner ends of the sleeves 28 and 43 are so shaped that they will project over the end of the gear 41 and extend thereabout. As the gear 41 meshes with the toothed member 49 on the sleeve 43 it will be manifest that when the gear 41 is rotated in the manner just described this gear 41 will not only rotate the sleeve 28 in one direction but will also rotate the sleeve 43 about the sleeve 28 and in the opposite direction with respect thereto.

It will be manifest that the speed of rotation of the sleeves 28 and 43 will be regulated by the diameter of the gears which operate the sleeves and by varying the diameter of the gear 41 different ratios of speeds between the sleeves 28—43 and the shaft 10 may be provided.

Secured within the housing 16 and encompassing the sleeves 43 and 28 is a wear plate 50 which extends about the shaft 10, the internal diameter of the wear plate 50 being considerably greater than the external diameter of the sleeve 43 to permit elongated rollers 51 to be interposed between the sleeve 43 and the wear plate 50.

These rollers 51 are journaled in annular members 52 so that they will rotate independently with respect to each other and also bodily in unison.

All of the rollers 31—44 and 51 are adapted for independent rotation with relation to the rollers of the respective series, but the rollers of each series travel bodily in unison.

With this construction it will be manifest that a leverage will be provided between the shaft 10 and the sleeves as the sleeves are operated by a positive gear connection with the shaft but independently with respect to each other, the outer sleeve 43 traveling at a slower rate of speed than the speed of rotation of the sleeve 28, while the sleeve 28 also rotates at a speed of rotation less than the speed of rotation of the shaft 10 and sleeves 11—22.

The reverse direction of movement of the sleeve 28 assists the series 31 of the rollers to turn in their natural direction which is also in a direction reverse to the direction of rotation of the shaft 10.

The outer surface of the inner sleeve 28 also assists the series 44 of rollers to turn in their natural direction and as these series of rollers 44 contact with the inner surface of the sleeve 43 causes the sleeve 43 to turn in the same direction as the direction of rotation of the shaft 10, but in a reverse direction to the direction of rotation of the sleeve 28.

The outer surface of the sleeve 43 assists the series of rollers 51 to turn in their natural direction as this series is rotated axially opposite to the direction of rotation of the outer sleeve but bodily travel in the same direction as the outer sleeve and the shaft 10.

The end thrust is relieved by means of end members 53 mounted upon the sleeve 11 for rotation therewith preferably by being keyed thereto as at 54. A nut or collar 55 is threaded upon the end of the sleeve 11 and prevents the end member 53 from moving longitudinally of the shaft in one direction.

Carried by the end of the housing 16 is a wear plate 56 secured thereto by suitable fastening devices 57 and the outer face of this plate 56 is preferably inclined as at 58.

The end member 53 is provided with a surface 59 disposed in proximity to and spaced from the surface 58 of the member 56 and these faces are preferably inclined with respect to each other.

Conical rollers 60 are disposed within the space between the faces 58—59 to contact therewith and these rollers 60, any number of which may be provided, are supported by means of bolts or screws 61 passing therethrough and being threaded into an annular member 62 whereby the rollers 60 will be supported for independent rotation with respect to each other and also for bodily movement in unison.

The rollers 60 are preferably tapered and any number of them may be provided to extend about the circumference of the member 53 as shown more clearly in Figure 4.

The nut or collar 55 on the sleeve 11 serves the purpose of holding the rollers 60 in contact with the surface 58 so that the end thrust will be exerted by the rollers 60 upon the surface 58 of the member 56.

The end members 15 of the housing are so shaped that they will extend over the members 56 and the rollers 60.

Oil or any other suitable lubricant may be supplied to the casing through a fill opening closed by a suitable plug 63 and clean out plugs 64 may also be provided in the housing.

With this improved construction it will be manifest that the parts may be readily assembled and that there will be a positive drive connection between the shaft and each of the sleeves 28—43. The speed of the rollers and also the friction thereof will be reduced by the speed of the sleeves being reduced and this is accomplished by the secondary or outer gear operating to transmit by means of its inner and outer circumference, the proper reverse directions to the inner and outer sleeves.

It will also be manifest that with this improved construction a greater pulling torque in steering will be procured by reason of the reduced bodily speed of movement of the rollers with respect to the shaft 10, which is accomplished by positively driving the sleeves 28 and 43 from the shaft 10. The shaft will rotate at a much greater speed than the sleeves would travel if the sleeves were not driven positively from the shaft. This will automatically reduce the bodily speed of the series of rollers 31, 44 and 51.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A roller bearing embodying a casing, a shaft therein, a sleeve within the casing spaced from and encompassing the shaft, rollers intermediate the shaft and sleeve, rollers intermediate the periphery of the sleeve and the casing, and means operatively connecting the sleeve with the shaft for rotating the sleeve and in both directions of rotation of the shaft.

2. A roller bearing embodying a casing, a shaft therein, a sleeve carried by the shaft, said sleeve being of a diameter considerably less than the diameter of the casing, a sleeve within the casing encompassing the first said sleeve, rollers between and contacting with both of said sleeves, and means for positively driving one of said sleeves direct from said shaft and in both directions of rotation of the shaft.

3. A roller bearing embodying a casing, a shaft within the casing, concentrically arranged sleeves spaced from each other and from the shaft and casing, rollers interposed between the sleeves and between the casing and shaft and respective adjacent sleeves, and means for positively driving one of said sleeves from the shaft in both directions of rotation of the shaft.

4. A roller bearing embodying a casing, a shaft within the casing, concentrically arranged sleeves spaced from each other and from the shaft and casing, rollers interposed between the sleeves and between the casing and shaft and respective adjacent sleeves, and means for positively rotating both of said sleeves from said shaft and in both directions of rotation of the shaft.

5. A roller bearing embodying a casing, a shaft within the casing, concentrically arranged sleeves spaced from each other and from the shaft and casing, rollers interposed between the sleeves and between the casing and shaft and respective adjacent sleeves, and positive drive connections between both of said sleeves and said shaft, said sleeves rotating in opposite directions with respect to each other.

6. A roller bearing embodying a casing, a shaft therein, a sleeve within the casing spaced from and encompassing the shaft, rollers intermediate the shaft and sleeve, rollers intermediate the periphery of the sleeve and the casing, and a gear connection between the shaft and one of said sleeves for positively rotating the latter.

7. A roller bearing embodying a casing, a shaft therein, a sleeve carried by the shaft, said sleeve being of a diameter considerably less than the diameter of the casing, a sleeve within the casing encompassing the first said sleeve, rollers between and contacting with both of said sleeves, and direct gear connections between each of said sleeves and the said shaft for positively rotating the sleeves.

8. A roller bearing embodying a casing, a shaft therein, concentrically arranged sleeves spaced from each other and from the shaft and casing and encompassing the shaft, rollers between the sleeves and between the shaft and casing and the respective adjacent sleeve, gears secured to the respective sleeves, a gear engaging both of the first said gears for rotating the said sleeves, and means for driving the second recited gear from the said shaft.

9. A roller bearing embodying a casing, a shaft therein, concentrically arranged sleeves spaced from each other and from the shaft and casing and encompassing the shaft, rollers between the sleeves and between the shaft and casing and the respective adjacent sleeve, gears secured to the respective sleeves, a gear engaging both of the first said gears for rotating the said sleeves, and a gear connected with the shaft and meshing with the second recited gear, all of said gears being disposed within the said casing.

10. A roller bearing embodying a casing, a shaft therein, a flange supported by and projecting into the casing intermediate the ends of the latter, said flange encompassing the shaft, a sleeve in the casing encompassing the shaft and spaced from the shaft and casing, rollers intermediate the respective faces of the sleeve and the shaft and casing, gears individual to and connected with the said shaft and sleeve, an additional shaft supported by said flange, and a gear mounted upon the last said shaft and having operative connection with both of the first recited gears.

11. A roller bearing embodying a casing, a shaft therein, concentric rotatable sleeves spaced from each other and from the shaft and casing and encompassing the shaft, rollers intermediate the sleeves and between the shaft and casing and the respective adjacent sleeve, gears connected with each of the sleeves, a support connected with the casing, a shaft carried by the support, a gear on the last said shaft having operative connection with both of the first said gears, and a gear connection between the second recited gear and the first said shaft, whereby the said sleeves will be positively driven from the first said shaft.

12. A roller bearing embodying a casing, a shaft therein, concentric rotatable sleeves spaced from each other and from the shaft and casing and encompassing the shaft, rollers intermediate the sleeves and between the shaft and casing and the respectively adjacent sleeve, gears connected with each of the sleeves, a support connected with the casing, a shaft carried by the support, a gear on the last said shaft having operative connection with both of the first said gears, and a gear connection between the second recited gear and the first said shaft, whereby the said sleeves will be positively driven from the first said shaft, the said casing being liquid tight and housing all of said parts.

13. A roller bearing embodying a casing, a shaft within the casing, concentrically arranged sleeves spaced from each other and from the shaft and casing, rollers interposed between the sleeves and between the casing and shaft and respective adjacent sleeves, and means for positively driving one of said sleeves from the shaft, the said housing being liquid tight and housing all of said parts.

14. A roller bearing embodying a casing, a shaft therein, a sleeve encompassing the shaft, rollers between the shaft and the casing wall and the respective adjacent surfaces of the sleeve, and means for positively rotating the sleeve within the said casing, and in both directions of rotation of the shaft.

15. A roller bearing embodying a casing, a shaft therein, a sleeve encompassing the shaft, rollers between the shaft and the casing wall and the respective adjacent surfaces of the sleeve, and a positive gear drive connection between the said sleeve and the said shaft for rotating the sleeve in both directions of rotation of the shaft.

In testimony whereof I have signed my name to this specification on this 11th day of October, A. D. 1927.

JOHN W. FOLEY.